US005741840A

United States Patent [19]
Lindquist et al.

[11] Patent Number: 5,741,840
[45] Date of Patent: Apr. 21, 1998

[54] COHESIVELY FAILING HOT MELT PRESSURE SENSITIVE ADHESIVE

[75] Inventors: Jeffrey S. Lindquist, Cottage Grove; Lisa L. Ryan, Dayton, both of Minn.

[73] Assignee: H.B. Fuller Licensing & Financing, Inc., St. Paul, Minn.

[21] Appl. No.: 676,864

[22] Filed: Jul. 3, 1996

[51] Int. Cl.⁶ .................. C08L 93/04; C08L 53/00; C08K 5/01

[52] U.S. Cl. .......... 524/271; 524/274; 524/474; 524/485; 524/486; 524/490; 524/491; 524/505; 524/484; 525/98; 525/99

[58] Field of Search .................. 524/271, 274, 524/474, 484, 485, 486, 490, 491, 505; 525/98, 99

[56] References Cited

U.S. PATENT DOCUMENTS

| | | | |
|---|---|---|---|
| 4,096,203 | 6/1978 | St. Clair | 524/505 |
| 4,411,954 | 10/1983 | Butch, III et al. | 525/339 |
| 4,460,364 | 7/1984 | Chen et al. | 524/505 |
| 4,680,333 | 7/1987 | Davis | 524/490 |
| 4,797,322 | 1/1989 | Huddleston et al. | 524/484 |
| 4,833,193 | 5/1989 | Sieverding | 524/474 |
| 4,857,594 | 8/1989 | Lakshmanan et al. | 525/98 |
| 4,866,911 | 9/1989 | Grindrod et al. | 53/432 |
| 4,900,770 | 2/1990 | Tomita et al. | 524/274 |
| 5,167,974 | 12/1992 | Grindrod et al. | 426/127 |
| 5,210,147 | 5/1993 | Southwick et al. | 525/98 |
| 5,559,165 | 9/1996 | Paul | 524/271 |

FOREIGN PATENT DOCUMENTS 3705992  8/1987  Germany ............... 524/487

Primary Examiner—Peter A. Szekely
Attorney, Agent, or Firm—Carolyn A. Fischer; Nancy N. Quan

[57] ABSTRACT

A hot melt pressure sensitive adhesive comprising a) from about 15% to about 30% by weight of a linear styrene-ethylene/butylene-styrene copolymer having a styrene content from about 15% to about 35% by weight and a coupling efficiency of less than about 75%; b) from about 20% to about 50% by weight of a tackifying resin selected from the group consisting of those tackifying resins having a softening point of less than about 100° C.; c) from about 30% to about 50% by weight of a plasticizing oil; and d) up to about 15% of a compatible polymer wherein the total polymer content does not exceed 30% by weight of the adhesive wherein the hot melt pressure sensitive adhesive fails cohesively during use.

11 Claims, No Drawings

COHESIVELY FAILING HOT MELT PRESSURE SENSITIVE ADHESIVE

FIELD OF THE INVENTION

This invention relates to a hot melt pressure sensitive adhesive comprising a high diblock styrene-ethylene/butylene-styrene block copolymer, a low melt point styrene domain associating resin, and a plasticizer. Specifically, this invention relates to a hot melt adhesive which fails cohesively during use.

BACKGROUND OF THE INVENTION

Hot melt pressure sensitive compositions are used widely in the adhesive industry due to their ability to adhere to a wide variety of substrates. Block copolymers are a preferred base polymer because of their elastomeric properties, their ability to be tackified, their compatibility with a wide range of tackifiers and plasticizers, and their high cohesive strength.

Block copolymers are also popular because of the wide variety of grades available with varying molecular weights, styrene contents, coupling efficiencies, and types of midblocks. The block copolymers most widely used have styrene endblocks, but the amount of styrene will vary. The types of midblocks most often encountered are isoprene, butadiene, and ethylene/butylene but this is not an exclusive list.

A primary property of a hot melt pressure sensitive composition is that it remains tacky at room temperature and can be adhered to substrates when it has completely cooled from its molten state. Block copolymers by themselves are inherently nontacky and it is necessary to use tackifying resins and plasticizers to develop the tack necessary for pressure sensitive adhesion.

Pressure sensitive adhesives are utilized for various applications including but not limited to labels, tapes, and packaging.

Block copolymers generally exhibit high cohesive strength resulting in adhesives that have high cohesive strength. While high cohesive strength is desirable for most applications such as for tapes and labels, this may not always be the requirement. Cohesive failure may be desirable for such applications as seal/reseal in the packaging industry. This type of package is peelable and reclosable indicating that it's easy for a consumer to open initially, and it may be resealed later either through use of mechanical means or through an adhesive for instance. This type of package may be utilized for perishable goods.

The films utilized for manufacturing seal/reseal type packages are generally polymeric in nature and may comprise polyethylene, polypropylene, polyvinyl chloride, polyester, and acrylonitrile-methyl acrylate copolymer polymerized and/or mixed with butadiene as a terpolymer. The problem encountered with block copolymer based products for seal/reseal applications of this nature is that the adhesive generally remains on one side of the container or the other due to the fact that the internal strength of the adhesive is as high or slightly higher than the bond strength or peel adhesion to the substrate. This results in stringing of the adhesive as it has a tendency to remain on the package, but also to stay associated with itself. The adhesive therefore does not stay with one or the other, but strings in an attempt to remain with both resulting in what is known in the art as "adhesive confusion."

There is prior art that describes the use of a higher cohesive strength adhesive that remains associated preferentially with one side of the package and does not fail cohesively. This is an attempt to alleviate the problem of stringing of the adhesive but it does not, however, solve the problem of "adhesive confusion," as the internal strength of the adhesive is only slightly higher than the peel adhesion to the substrate. U.S. Pat. No. 4,096,203 to St. Clair teaches a low cohesive strength hot melt adhesive employing either a styrene-butadiene-styrene (SBS) block copolymer or a styrene-isoprene-styrene (SIS) block copolymer. SBS and SIS block copolymer based adhesives are known to exhibit poorer thermal stability, and also exhibit an odor that is not as desirable for the packaging of perishables such as food.

The current inventors have found a solution to the aforementioned problems by employing hot melt pressure sensitive adhesives based on a styrene-ethylene/butylene-styrene block copolymer which fails cohesively during use. The adhesive remains with both sides of the package and allows for a low opening force, and no stringing by the adhesive as the package is opened. SEBS block copolymer based adhesives have good thermal stability, and also exhibit a lower odor than do the SIS or SBS block copolymer based adhesives making them more desirable for the packaging of perishables. None of these are contemplated nor suggested by the prior art, nor would the compositions of the prior art exhibit the cohesive failure when employing a SEBS block copolymer.

SUMMARY OF THE INVENTION

The present invention discloses a cohesively failing hot melt pressure sensitive adhesive comprising a) from about 15% to about 30% by weight of a linear styrene-ethylene/butylene-styrene block copolymer having a styrene content from about 15% to about 35% by weight and a coupling efficiency of less than about 75%; b) from about 20% to about 50% by weight of a tackifying resin selected from the group consisting of those tackifying resins having a softening point of less than about 100° C.; c) from about 30% to about 50% by weight of a plasticizing oil; and d) up to about 15% of a compatible polymer wherein the total polymer content does not exceed 30% by weight of the adhesive.

These adhesives are characterized by viscosities of less than about 2500 cPs at 150° C. and T-peel values of less than about 5 lbs/inch or 1 kg/cm when measured using an instron®, and softening points of between about 65° C. and 85° C. They are further characterized by having excellent thermal stability and low odor.

These adhesives are useful where a seal/reseal or peelable/reclosable type of closure is needed. The packaging industry uses seal/reseal containers for perishables such as cheese and meat. Such containers are often polymeric and are made from polyethylene, polypropylene, polyester, polyvinyl chloride, and acrylonitrile-methyl acrylate copolymer polymerized and/or mixed with butadiene for instance. The adhesives exhibit excellent adhesion to these difficult to bond substrates.

The low viscosities also allow for a low application temperatures where the substrates have heat sensitivity. The temperature of application for the adhesives is between about 120° C. and about 165° C.

The low cohesive strength combined with excellent adhesion allows for a good seal prior to opening, but a low opening force, and a smooth peel with a lack of stringing or legging exhibited upon opening the package. The adhesives are inherently tacky and allow for a reseal of the package so that perishables may stay fresher, and offer further benefit due to the low odor. A further advantage is that these adhesives may be made for tamper evident packaging if it is desired.

DETAILED DESCRIPTION OF THE PREFERRED EMBODIMENTS

The block copolymers useful herein include linear triblock copolymers having the general configuration A-B-A and linear diblock copolymers having the general configuration A-B wherein the A block is polystyrene and the B block is ethylene/butylene. The styrene content of the block copolymers is between about 15% and about 35% by weight, the coupling efficiency is less than about 75%, and the melt index is less than about 100 g/10 min., and more commonly less than about 75 g/10 min. The coupling efficiency refers to the amount of triblock present as compared to the amount of diblock present in the polymer. Examples of useful polymers include Kraton® G1726, a linear A-B diblock copolymer with a 30% coupling efficiency, and Kraton® G1657, a linear A-B-A triblock copolymer with a 70% coupling efficiency. These polymers are useful from about 15% to about 30% by weight. The tackifying resins useful herein may include liquid aromatic hydrocarbon resins, vinyl toluene and alpha-methylstyrene resins having a softening point of less than about 100° C. and more preferably less than about 75° C., rosins and rosin derivatives, and mixtures thereof. Examples of useful resins may include Kristalex® 3070 and Kristalex® 1085, alpha-methylstyrene resins having softening points of about 70° C. and 85° C. respectively available from Hercules in Wilmington, Del.; Foral® AX, a hydrogenated rosin acid having a softening point of about 75° C. and an acid number of 158 available from Hercules; Regalrez® 1018, a liquid cycloaliphatic hydrocarbon resin with a pour point of 18° C. available from Hercules; Piccolastic® A-5, a liquid cycloaliphatic hydrocarbon resin with a pour point of 5° C. available from Hercules; and Sylvatac® 5N, a liquid rosin ester with a pour point of 5° C. available from Arizona Chemical Co. located in Panama City, Fla. The tackifying resins are useful in amounts of between about 20% and about 50% by weight.

Plasticizers, which are typically fluid, are necessary to the present invention. Plasticizers may include oil and liquid elastomers, or any other material which flows at ambient temperatures and is compatible with the block copolymer. The plasticizers useful herein may include mineral and petroleum based hydrocarbon oils, polybutene, liquid elastomers, or functionalized oils such as glyceryl trihydroxyoleate or other fatty oils. The oils used are primarily hydrocarbon oils which are low in aromatic content and are paraffinic or napthenic in character. The oils are preferably low in volatility, transparent, and have as little color and odor as possible. This invention also contemplates the use of olefin oligomers, low molecular weight polymers, vegetable oils and their derivatives and similar plasticizing liquids.

Examples of useful plasticizers include Calsol™ 5120, a naphthenic petroleum based oil available from Calumet Lubricants Co. in Indianapolis, Ind.; Kaydol™ White Mineral Oil, a paraffinic mineral oil available from Witco Corp. in New York, N.Y.; Parapol™ 950 and 1300, liquid butene homopolymers available from Exxon Chemical Co. in Houston, Tex.; and Indopol® H-50, H-100, and H-300, liquid butene homopolymers, available from Amoco Corp. in Chicago, Ill. One skilled in the art would recognize that any generic 500 second or 1200 second naphthenic process oil would also be useful. These plasticizers are useful in amounts of from about 30% to about 50% by weight.

The compatible polymers useful herein may include A-B-A triblock copolymers, A-B diblock copolymers, A-B-A-B-A-B multiblock copolymers, and radial block copolymers, and grafted versions thereof; homopolymers, copolymers, and terpolymers of ethylene; and propylene. Useful block copolymers having the general configuration A-B-A, having styrene endblocks and ethylene-butadiene midblocks, are described U.S. Pat. No. 4,136,699 to Collins et al. These polymers are available under the tradename of Kraton™ commercially available from Shell Chemical Co., located in Houston, Tex. One skilled in the art would recognize that there are various grades of Kraton® G available for use. Some examples include Kraton® G-1652, and Kraton® G-1650, saturated A-B diblock/A-B-A triblock mixtures with ethylene-butadiene midblocks; Kraton® D-1112, a high percent A-B diblock linear styrene-isoprene-styrene polymer; Kraton® D-1107 and D-1111, primarily A-B-A triblock linear styrene-isoprene-styrene polymers; Stereon® 841A, an A-B-A-B-A-B multiblock styrene-butadiene-styrene polymer available from Firestone located in Akron, Ohio; Europrene® Sol T 193B a linear styrene-isoprene-styrene polymer available from Enichem Elastomers in New York, N.Y.; Europrene® Sol T 163, a radial styrene-butadiene-styrene polymer also available from Enichem Elastomers; Vector® 4461-D, a linear styrene-butadiene-styrene polymer available from Exxon Chemical Co. in Houston, Tex.; Vector™ 4111, 4211, and 4411, fully coupled linear styrene-isoprene-styrene polymers containing different weight percentages of styrene endblock; and Vector® 4113, a highly coupled linear styrene-isoprene-styrene polymer also available from Exxon Chemical Co. This list is not exclusive, and there are many other grades of block copolymers that are available which are known to those of skill in the art, and would be contemplated by this invention.

Other useful polymers include homopolymers, copolymers and terpolymers of ethylene, and polypropylene. Some examples include ethylene vinyl acetate copolymers such as Elvax® 210 available from DuPont Chemical Co. located in Wilmington, Del.; Escorene® UL 7505 available from Exxon Chemical Co.; Ultrathene® UE 64904 available from Quantum Chemical Corp. located in Rolling Meadows, Ill.; Elvax® 205W available from DuPont Chemical Co.; AT® 1850M available from AT Polymers & Film Co. in Charlotte, N.C.; and Elvax® 410 available from DuPont Chemical Co. There are numerous other grades of ethylene vinyl acetate copolymers available from a variety of chemical companies.

Other useful polymers include Exact® 5008, an ethylene-butene polymer; Exxpol® SLP-0394, an ethylene-propylene polymer; Exact® 3031, an ethylene-hexene polymer all available from Exxon Chemical Co.; and Insight® SM-8400, an ethylene-octene polymer available from Dow Chemical Co. located in Midland, Mich. These polymers are useful up to about 15% by weight.

A stabilizer or antioxidant is also preferably used in hot melt adhesives. These compounds are added to protect the adhesive from degradation caused by reaction with oxygen induced by such things as heat, light, or residual catalyst from the raw materials such as the tackifying resin. Such antioxidants are commercially available from Ciba-Geigy in Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn. and Ethanox®1330 available from Albemarle Corp. in Baton Rouge, La. Many such antioxidants are available either to be used alone or in combination with other such antioxidants. These compounds are added to the hot melts in small amounts and have no effect on the other physical properties. Other compounds that could be added that also do not affect physical properties are pigments which add color, or fluorescing agents, to mention only a couple. Additives like these are known to those skilled in the art.

These adhesives are characterized by low viscosities of less than about 2500 cPs at 150° C., and softening points of between about 65° C. and about 85° C. The low viscosities allow for low temperatures of application of between about 120° C. and 165° C. The low softening points allow for low heat seal temperatures which is important when heat sealing containers made from heat sensitive thermoplastic materials. A recent trend in the packaging industry has been to go with lower gauge thermoplastic films which are more heat sensitive.

T-peel values as measured on an Instron are less than about 5 lbs/inch or 1 kg/cm. They have excellent adhesion to thermoplastic materials such as polyethylene, polypropylene, polyester, polyvinyl chloride, and acrylonitrile-methyl acrylate copolymer polymerized and/or mixed with butadiene for instance. The low peel strength and excellent adhesion combine to allow for an easy opening force of packages and cohesive failure without stringing or legging. This is particularly useful for the seal/reseal or peelable/reclosable type packages that are popularly used for perishables, especially in the food packaging industry. Containers may be opened, and reclosed to keep food items fresher.

The initial seal is generally referred to as a hermetic, or gas tight seal. This is to maintain the freshness of the goods. Many packages do not allow for reclosure of the seal, however, which is a disadvantage when it is desirable to keep the packaged goods fresh. This lack of a reseal ability would then require that the goods be transferred to another container. Due to the pressure sensitive nature of the hot melts of the present invention, packages can be hermetically sealed initially, opened, and resealed later.

These seals may be formed in production using a variety of applications. However, it is most common that the adhesive would be initially applied to the body or base of a container, the container is then filled with product, and then the top or lid of the container is heat sealed to the base or body. The initial application temperature of these adhesives is between about 120° C. and about 165° C. Heat seal conditions may vary with different equipment, but generally application temperatures are between about 65° C. and about 100° C., dwell times are between about 1 second to about 10 seconds, and airline pressures are between about 50 psi and 150 psi. Application temperatures are necessarily higher than heat seal temperatures due to the fact that application equipment requires low viscosities for good application of the hot melt without stringing or clogging of nozzles, and adhesion of hot melt adhesives decreases as the temperature is decreased.

This invention is further illustrated by the following non-limiting examples.

EXAMPLES

Test Methods

1. Melt Viscosities

The melt viscosities of the hot melt adhesives were determined on a Brookfield Thermosel Viscometer Model DVI using a number 21 spindle.

2. T-Peel Testing

The adhesive samples were heated to between about 90° C. and 95° C. and drawn onto a rigid polyethylene sheet using a drawn down bar supplied from Paul N. Gardner Co. Inc. located in Pompano Beach, Fla. using a 4 mil or 100 g/in$^2$±20 g/in$^2$ coat weight. The coated material is then allowed to dwell for a minimum of 16 hours. Samples are cut from the material in 1"×5" segments. An uncoated 1"×5" strip is then placed onto the coated material and the layers are then heat sealed using a Sentinel heat sealer with 90 psi air line pressure, a 4 second dwell time, and a heat seal temperature of about 75° C. The bonds are allowed to dwell for a minimum of 4 hours, and then T-peel values are determined using an Instron with a crosshead speed of 10"/minute.

3. 180° Peels

The samples are prepared as they are for T-Peel testing. The 180° peels are run on an Adhesion/Release Tester AR-100 manufactured by Chem Instruments in Fairfield, Ohio.

The adhesives were prepared using a high shear sigma blade mixer such as those manufactured by Littleford Day located in Florence, Ky. Using this method, the mixer may be charged with some of the tackifier and/or oil until molten. The polymer(s) are then slowly added to the mixer and blended until smooth and homogeneous. The remaining tackifying resin and oil is, if any, is then slowly added. Many variations of this procedure are possible, and in fact, all of the components can be added to the mixer at once and blended until smooth. The order of addition is not critical.

These samples may also be prepared using an upright mixer, known also in the industry as a lightening mixer, such as the Stirrer Type RZRI manufactured by Caframo in Wiarton, Ontario, Canada. Using this method, all of the components, except the block copolymers or other compatible polymers, are melted first and then the polymer(s) are slowly added and blended until smooth and homogeneous. The temperature for both methods is between about 150° C. and 175° C.

There are other commercially available methods of manufacturing these adhesives.

TABLE 1

|  | 1 | 2 | 3 | 4 |
| --- | --- | --- | --- | --- |
| Kraton G1726 | 20.0 | 20.0 | 22.5 | 25.0 |
| Kristalex 3070 | 40.0 | 30.0 | 27.5 | 25.0 |
| Regalrez 1018 | — | 5.0 | 5.0 | 7.5 |
| Kaydol Oil | 39.5 | 44.5 | 44.5 | 42.0 |
| Irganox 1010 | 0.5 | 0.5 | 0.5 | 0.5 |
| Failure Type | Coh | Coh | Coh | Coh |

Table 1 illustrates the cohesive failure of several compositions of the invention.

TABLE 2

|  | 5 | 6 | 7 | 8 | 9 | 10 | 11 |
| --- | --- | --- | --- | --- | --- | --- | --- |
| Kraton G1726 | 16.0 | 21.0 | 21.0 | 21.0 | 21.0 | 20.0 | 20.0 |
| Kristalex 3070 | 36.0 | 21.0 | 21.0 | 21.0 | 21.0 | 17.0 | 24.0 |
| Foral AX | — | 10.0 | 10.0 | 10.0 | 10.0 | 10.0 | 5.0 |
| 500 sec Process Oil | 42.5 | 42.5 | 42.5 | 42.5 | 42.5 | 42.5 | 40.0 |
| Exxpol 394 | 5.0 | 5.0 | — | — | — | — | — |
| EVA (28-400) | — | — | 5.0 | — | — | — | — |

TABLE 2-continued

|  | 5 | 6 | 7 | 8 | 9 | 10 | 11 |
|---|---|---|---|---|---|---|---|
| EVA (18-500) | — | — | — | 5.0 | — | — | — |
| EnBA (35-400) | — | — | — | — | 5.0 | 10.0 | 5.0 |
| Irganox 1010 | 0.5 | 0.5 | 0.5 | 0.5 | 0.5 | 0.5 | 0.5 |
| Failure Type | Coh | Coh | Coh | Coh | Coh | Coh | Coh |

Table 2 illustrates the cohesive failure of compositions utilizing a compatible polymer.

TABLE 3

|  | 12 | 13 | 14 | 15 |
|---|---|---|---|---|
| Kraton G1726 | 23.0 | 21.0 | 22.0 | 22.0 |
| Kristalex 3070 | 31.0 | 36.0 | 37.0 | 36.0 |
| 500 sec Process Oil | 45.5 | 42.5 | 40.5 | 41.5 |
| Irganox 1010 | 0.5 | 0.5 | 0.5 | 0.5 |
| Type of Failure | Coh | Coh | Coh | Coh |
| 180° Peel (#/in² Avg. | 1.5 | 1.7 | 2.0 | 3.2 |

Table 3 illustrates both the cohesive failure of compositions of the invention, and the low peel values obtained which allow for an easy opening force when the compositions are utilized on packages.

TABLE 4

|  | 16 | 17 | 18 | 19 | 20 | 21 | 22 |
|---|---|---|---|---|---|---|---|
| Kraton G1726 | 20.0 | 21.0 | 20.0 | 22.0 | 18.0 | 24.0 | 21.0 |
| Kristalex 3070 | 24.5 | 28.5 | 24.5 | 24.5 | 24.5 | 24.5 | 28.5 |
| Foral Ax | 5.0 | 5.0 | 5.0 | 5.0 | 5.0 | 5.0 | 5.0 |
| 500 sec Process Oil | 40.0 | 40.0 | 40.0 | 40.0 | 40.0 | 40.0 | 40.0 |
| EnBA (35-400) | — | — | 10.0 | 8.0 | 12.0 | 6.0 | 5.0 |
| EVA (28-400) | 10.0 | 5.0 | — | — | — | — | — |
| Irganox 1010 | 0.5 | 0.5 | 0.5 | 0.5 | 0.5 | 0.5 | 0.5 |
| Type of Failure | Coh | Coh | Coh | Coh | Coh | Coh | Coh |
| T-Peel | 0.7 | 1.00 | 0.5 | 0.8 | 0.3 | 1.7 | 1.3 |

Table 4 illustrates the cohesive failure of formulas utilizing a compatible polymer, and also illustrates the low T-peel values obtainable which allow an easy opening force when the compositions are utilized on packages.

TABLE 5

|  | 13 | 14 | 17 | 19 |
|---|---|---|---|---|
| Kraton G1726 | 21.0 | 22.0 | 21.0 | 22.0 |
| Kristalex 3070 | 36.0 | 37.0 | 28.5 | 24.5 |
| Foral AX | — | — | 5.0 | 5.0 |
| 500 sec Process Oil | 42.5 | 40.5 | 40.0 | 40.0 |
| EnBA (35-400) | — | — | — | 8.0 |
| EVA (28-400) | — | — | 5.0 | — |
| Irganox 1010 | 0.5 | 0.5 | 0.5 | 0.5 |
| Viscosity @ |  |  |  |  |
| 250° F. | 1,265 | 1,775 | 1,480 | 2,060 |
| 300° F. | 390 | 500 | 470 | 670 |

Table 5 illustrates the low viscosities obtained with the compositions of the invention.

What is claimed is:

1. A hot melt pressure sensitive adhesive comprising:
   a) from about 15% to about 30% by weight of the adhesive of a linear styrene-ethylene/butylene-styrene block copolymer having a styrene content from about 15% to about 35% by weight of the block copolymer and a coupling efficiency of less than about 75%;
   b) from about 20% to about 50% by weight of the adhesive of a tackifying resin selected from the group consisting of those tackifying resins having a softening point of less than about 100° C.;
   c) from about 30% to about 50% by weight of the adhesive of a plasticizing oil; and
   d) from about 0% to about 15% by weight of the adhesive of a second compatible polymer wherein the total polymer content does not exceed 30% by weight of the adhesive; wherein the hot melt pressure sensitive adhesive fails cohesively during use.

2. The adhesive of claim 1 made by the process comprising the steps of:
   a) melting the adhesive components; and
   b) blending the adhesive components until smooth and homogeneous;
   wherein the melting and blending of each component may occur in any order of addition.

3. The method of claim 2 wherein a high shear sigma blade mixer is used for melting and blending.

4. The method of claim 2 wherein an upright or lightening mixer is used for melting and blending.

5. The adhesive of claim 1 wherein the viscosity is less than about 2,500 cPs at 150° C.

6. The adhesive of claim 1 wherein the T-peel force as measured on an Instron is less than about 1 kg/cm.

7. The adhesive of claim 1 wherein the compatible plasticizer is selected from the group consisting of napthenic process oil, paraffinic process oil, polybutene, and liquid elastomers.

8. The adhesive of claim 1 wherein the tackifier is selected from the group consisting of liquid aromatic hydrocarbons; and vinyl toluene and alpha-methyl styrene and rosins and rosin ester having a softening point of less than about 100° C.

9. The adhesive of claim 1 wherein the second compatible polymer is selected from the group consisting of homopolymers, copolymers and terpolymers of ethylene and propylene, rubbery block copolymers and mixtures thereof.

10. The adhesive of claim 9 wherein the second compatible polymer is selected from the group consisting of ethylene n-butyl acrylate, ethylene methyl acrylate and vinyl acetate copolymers.

11. The hot melt pressure sensitive adhesive of claim 1 comprising from about 15% to about 25% by weight of the adhesive of a styrene-ethylene/butylene-styrene block copolymer having a styrene content from about 15% to about 35% by weight and a coupling efficiency of less than about 75%, from about 30% to about 40% by weight of the adhesive of a tackifying resin selected from the group consisting of vinyl toluene and alpha-methylstyrene having a softening point of less than about 75° C., from about 35% to about 45% by weight of the adhesive of a plasticizing oil and from about 5% to about 15% by weight of the adhesive of a compatible polymer selected from the group consisting of ethylene n-butyl acrylate, ethylene methyl acrylate, ethylene vinyl acetate and mixtures thereof.

* * * * *